United States Patent
Yamashiro et al.

[11] Patent Number: 6,154,976
[45] Date of Patent: Dec. 5, 2000

[54] MEASURING DEVICE

[75] Inventors: Hiroshi Yamashiro; Masashi Tsuboi; Toshiharu Ozeki; Hiroaki Kawada, all of Kawasaki, Japan

[73] Assignee: Mitutoyo Corporation, Kanagawa-ken, Japan

[21] Appl. No.: 09/110,258

[22] Filed: Jul. 6, 1998

[30] Foreign Application Priority Data

Jul. 17, 1997 [JP] Japan .................................. 9-192407

[51] Int. Cl.[7] ...................................................... G01B 3/22
[52] U.S. Cl. .................................. 33/832; 33/836; 33/706
[58] Field of Search .............................. 33/832, 833, 834, 33/836, 703, 705, 706, 707, 708, 783, 784, 791, 792, 793, 794, 795, 796, 810, 811, 556, 558, 559, 561, 571

[56] References Cited

U.S. PATENT DOCUMENTS

| | | |
|---|---|---|
| 4,530,159 | 7/1985 | Ernst ........................................ 33/707 |
| 4,530,160 | 7/1985 | Feichtinger .............................. 33/832 |
| 4,765,064 | 8/1988 | Maeda ..................................... 33/832 |
| 4,798,004 | 1/1989 | Suzuki . | |
| 5,172,485 | 12/1992 | Gerhard et al. ........................... 33/706 |
| 5,289,729 | 3/1994 | Tsunoda et al. ......................... 33/571 |
| 5,861,754 | 1/1999 | Ueno et al. ............................... 33/706 |

*Primary Examiner*—Christopher W. Fulton
*Attorney, Agent, or Firm*—Oliff & Berridge, PLC

[57] ABSTRACT

Present invention relates to a measuring device which is capable of improving anti-vibration property and anti-impact property. The measuring device comprises a case 1, a spindle 11 displaceably provided to the case 1, a sensor on stationary side attached to the case 1 through a base 33 and a sensor on movable side formed on a scale 35 attached to the spindle 11, and a relative displacement amount of the two sensors 32 and 34 opposing at a predetermined gap G therebetween. A gap enlargement limiting pin 41 is provided on the side of the spindle 11 to restrict a fluctuation of the gap G caused by vibration of the spindle 11 and the like within a predetermined allowance, and a gap reduction limiting film 42 is provided to the sensor on stationary side 32.

13 Claims, 7 Drawing Sheets

MEASURING DEVICE

BACKGROUND OF THE INVENTION

1. Field of the Invention

This invention relates to a measuring device comprising a measuring device body and a spindle held in the body to be movable in the axial direction for measuring a dimension of an object to be measured according to a displacement amount of the spindle in the axial direction. More specifically, this invention relates to a measuring device for detecting the displacement amount of the spindle in the axial direction as an electric signal by a detecting means including a sensor on stationary side attached to the measuring device body and a sensor on movable side provided on the spindle oppositely to the sensor on stationary side with a predetermined gap. This invention can be applied to a dial gauge, a linear displacement measuring device and the like.

2. Description of Related Art

Conventionally, a known displacement detecting measuring device includes a measuring device body, a spindle movably provided on the measuring device body and a detecting means for converting relative movement displacement amount between the spindle and the measuring device body into electric signal.

As above-mentioned detecting means, a conventional detecting means has a sensor on stationary side attached on the measuring device body and a sensor on movable side disposed on the spindle, both sensors being opposed at a predetermined gap therebetween, to convert a relative movement displacement amount into electric signal.

Specifically, above detecting means employs optical or electrostatic detecting method by using a sensor on stationary side (such as light casting and receiving portion or electrode) and a sensor on movable side (such as optical matrix and electrode) provided on the spindle at a predetermined gap against the sensor on stationary side.

And a digital display dial gauge which detects the displacement amount of the spindle movably disposed on the measuring body as an electric signal by aforementioned detecting means to transmit to an outside processor or to display digitally to a digital display provided on the measuring device body is known as a measuring device.

Such measuring devices are often used as in-line equipment (for simultaneous measuring on a process line) thus high durability is required. Accordingly, a stroke bearing (a bearing of which holding cylinder rotatably holds a plurality of balls thereon) is used as a bearing of the spindle to enhance durability.

In adopting the stroke bearing, a "double holding structure" in which two separate parts of the spindle with a detecting means disposed therebetween is held by the stroke bearings respectively and a "single holding structure" in which only one part of the spindle is held by the stroke bearing may be considered.

The "double holding structure" is, for instance, shown in U.S. Pat. No. 5,289,729. However, the axis line of the two stroke bearing is necessary to be aligned in the "double holding structure", resulting in intricate adjustment thereof. And the size of the device gets larger since the stroke bearings are disposed on the two parts of the spindle in the axial direction.

In the "single holding structure", the size of the device can be reduced since the stroke bearings are centralized to a single portion of the spindle even when a plurality of the stroke bearings are employed to be linearly connected. And Abbe's law concerning accuracy can be easy to attain since the detecting means can be disposed close to an axis line extending from the tip end of the spindle, with the reduction in size.

However, a rigidity at the tip end of the spindle is lowered in a type with long moving stroke of the spindle since the "single holding structure" is used, which result in lowering the rigidity in the detecting portion of the sensor on stationary side and the sensor on movable side.

Particularly, frequent vibration and impact are highly likely during the use in in-line equipment, and a gap between the sensor on stationary side and the sensor on movable side tends to fluctuate by the vibration and the impact. When the gap between the sensor on stationary side and the sensor on movable side fluctuates and goes beyond a predetermined range of the gap, the detecting means outputs error signal and miscount occurs in signal processor, thus failing to achieving stable and highly accurate measurement.

Accordingly, it is desirable to develop a measuring device with high anti-vibration and anti-impact property. For instance, in the U.S. Pat. No. 5,172,485, a spacer is provided to a gap between the sensor on stationary side and the sensor on movable side and each sensor is in close contact with each other having the spacer disposed therebetween, thereby always maintaining a gap corresponding to the spacer between both of the sensors.

However, a durability problem due to an abrasion of the spacer or the like occurs in above structure in which the spacers are always in close contact with each other.

The object of present invention is to solve above-mentioned conventional problems, that is, to provide a measuring device of which anti-vibration property and anti-impact property are improved, and at the same time, durability and reliability are possible to be enhanced.

SUMMARY OF THE INVENTION

The measuring device according to present invention has a measuring device body, a spindle disposed movably in an axial direction relative to the measuring device body with a part thereof in the axial direction being supported by the measuring device body and a detecting means for detecting a displacement amount of the spindle relative to the measuring device body. The detecting means includes a sensor on a stationary side attached to the measuring device body and a sensor on a movable side provided on the spindle which are oppositely disposed at a predetermined gap therebetween and detects a displacement amount of both of the sensors. The measuring device is characterized in that any one of the measuring device body and the spindle is provided with a gap enlargement limiting member which limits enlargement of the gap by abutting to the other one of the measuring device body and the spindle when the sensor on movable side is displaced away from the sensor on stationary side.

According to aforementioned structure, it is possible to retain the gap within a predetermined allowance, since the gap enlargement limiting member limits the gap to be enlarged by temporally abutting to any one of the measuring device body and the spindle when the spindle leans and the sensor on movable side is inclined to displace away from the sensor on stationary side. Therefore, even when a vibration or an impact is applied, the gap between the sensor on movable side and the sensor on stationary side can be retained within a predetermined range, in other words, anti-vibration property and anti-impact property can be enhanced, thereby improving reliability.

The gap enlargement-limiting member may be projectingly and integrally formed on any one of the measuring device body and the spindle.

However, it is preferable that the gap enlargement-limiting pin is provided on the spindle at a predetermined space against the measuring device body.

In this way, the gap enlargement limiting pin can be formed as an independent body to the spindle and the measuring device body, and attached to or press-fitted to the spindle, thereby facilitating manufacture.

In another aspect of present invention, the measuring device according to present invention has a measuring device body, a spindle disposed movably in an axial direction relative to the measuring device body with a part thereof in the axial direction being supported by the measuring device body and a detecting means for detecting a displacement amount of the spindle relative to the measuring device body. The detecting means includes a sensor on a stationary side attached to the measuring device body and a sensor on a movable side provided on the spindle which are oppositely disposed at a predetermined gap therebetween to detect a displacement amount of both of the sensors. And the measuring device is characterized in that any one of the measuring device body and the spindle is provided with a gap reduction limiting member which limits reduction of the gap by abutting to the other one of the measuring device body and the spindle when the sensor on movable side is displaced toward the sensor on stationary side.

According to aforementioned structure, it is possible to retain the gap within a predetermined allowance, since the gap reduction limiting member limits the gap to be reduced by temporally abutting to any one of the measuring device body and the spindle when the spindle leans and the sensor on movable side is inclined to displace toward the sensor on stationary side. Therefore, even when a vibration or an impact is applied, the gap between the sensor on movable side and the sensor on stationary side can be retained within a predetermined range, in other words, anti-vibration property and anti-impact property can be enhanced, thereby improving reliability.

As the gap reduction limiting member, a pin or a projection may be integrally or independently formed on any one of the measuring device body and the spindle. However, it is preferable that the gap reduction limiting film is disposed along the periphery of a face of the sensor on stationary side opposing the sensor on movable side.

By above configuration, the gap reduction limiting film may be also used as a dam of sealing resin when the sensor on stationary side is assembled on the base by the sealing resin. Further, when a covering glass is applied on the sensor on stationary side, the gap reduction limiting film may be used for protecting the covering glass from being contacting to a member with the sensor on stationary side provided thereon, a scale for instance.

According to still another aspect of present invention, the measuring device according to present invention has a measuring device body, a stroke bearing rotatably holding a plurality of balls within a holding cylinder thereof, a spindle disposed movably in an axial direction relative to the measuring device body with a part thereof in the axial direction being supported by the measuring device body and a detecting means for detecting a displacement amount of the spindle relative to the measuring device body. The detecting means includes a sensor on a stationary side attached to the measuring device body and a sensor on a movable side provided on the spindle which are oppositely disposed at a predetermined gap therebetween to detect a displacement amount of both of the sensors. The measuring device is characterized in that the spindle is movably supported by the measuring device body through a supporting structure with a plurality of the stroke bearings linearly connected with each other.

According to aforementioned structure, the spindle is supported movably to the measuring device body through a supporting structure with the plurality of stroke bearings being linearly connected, in other words, the bearing spun can be extended substantially the plural times as compared to conventional supporting structure, the rigidity of the supporting structure can be improved. Accordingly, anti-vibration property and anti-impact property can be enhanced, thereby improving reliability.

DETAILED DESCRIPTION OF THE PREFERRED EMBODIMENT(S)

A preferred embodiment of present invention is explained below with reference to drawings.

[Basic Structure as a Measuring device]

Figure 1:
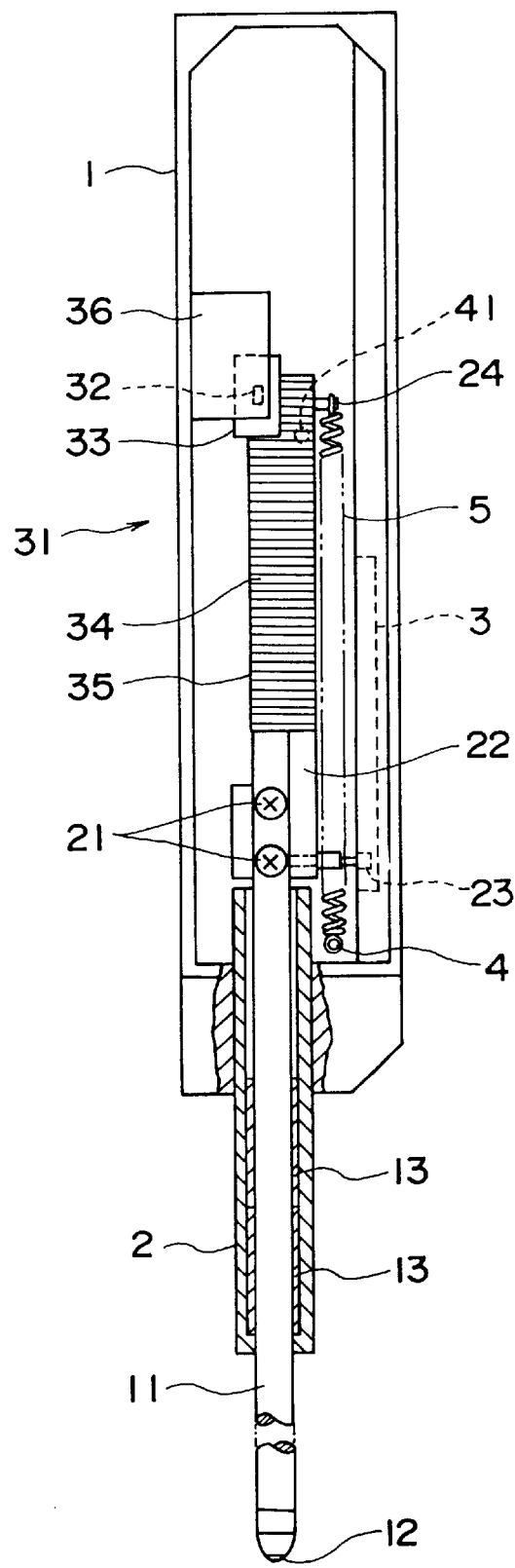
FIG. 1 is a view showing a preferred embodiment of present invention.
Figure 2:
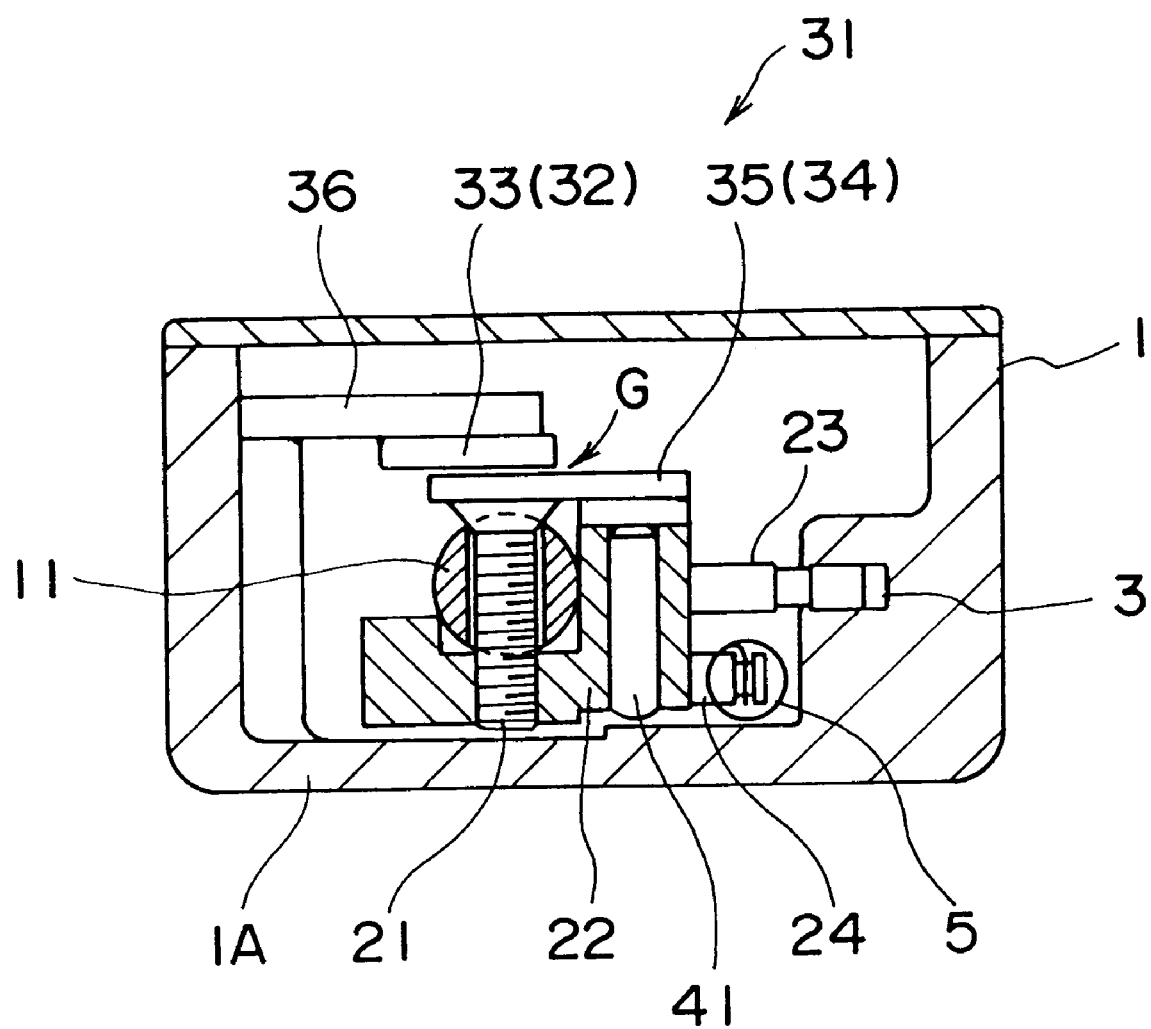
FIG. 2 is a horizontal sectional view of FIG. 2.

FIG. 1 is a front elevational view of a linear displacement measuring device according to present embodiment and FIG. 2 is a horizontal sectional view of FIG. 1. As shown in the Figures, the linear displacement measuring device according to present embodiment includes a box-shaped case 1 with longer vertical length than width as a measuring device body, a spindle 11 disposed to a lower wall of the case 1 movably in an axial direction (top and bottom direction of FIG. 1) through a stem 2 and a detecting means 31 for detecting a movement displacement amount of the spindle 11.

Figure 3:
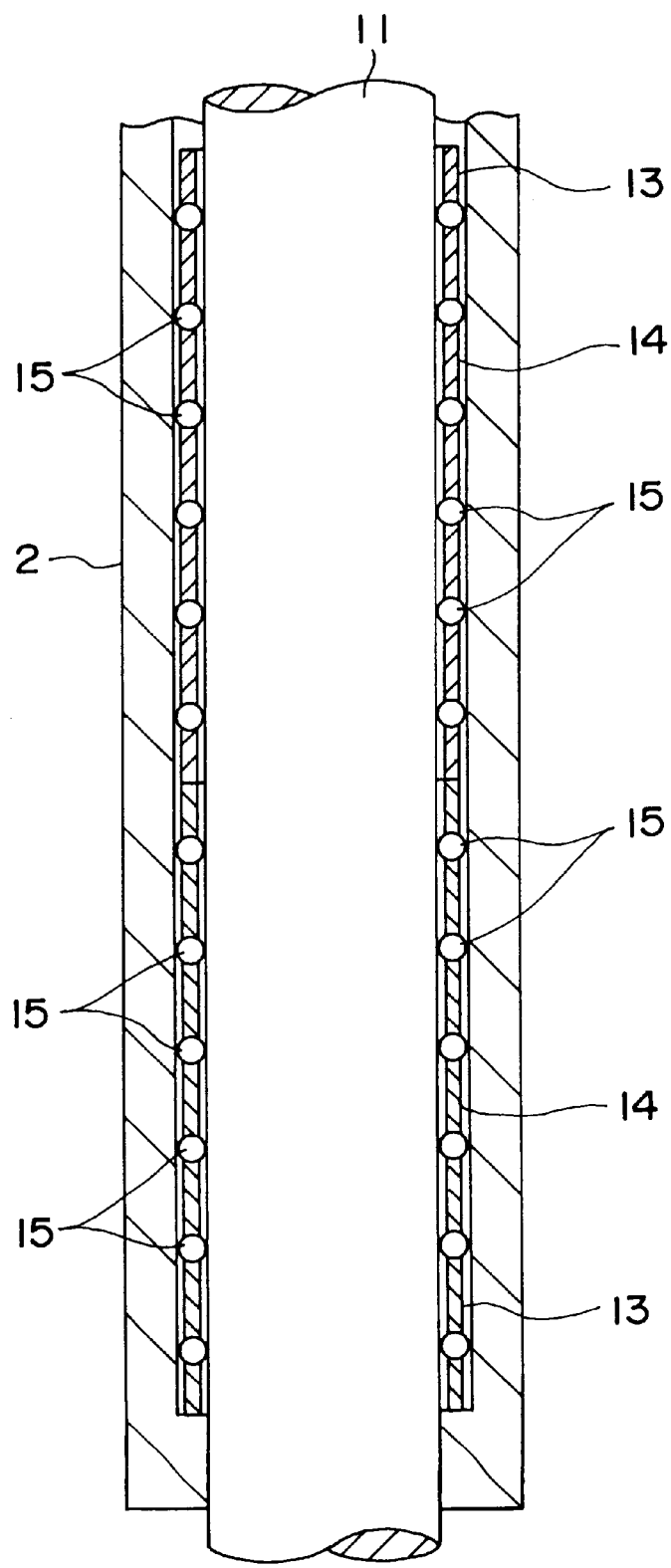
FIG. 3 is a sectional view showing a supporting structure of a spindle in the aforementioned embodiment.
Figure 4:
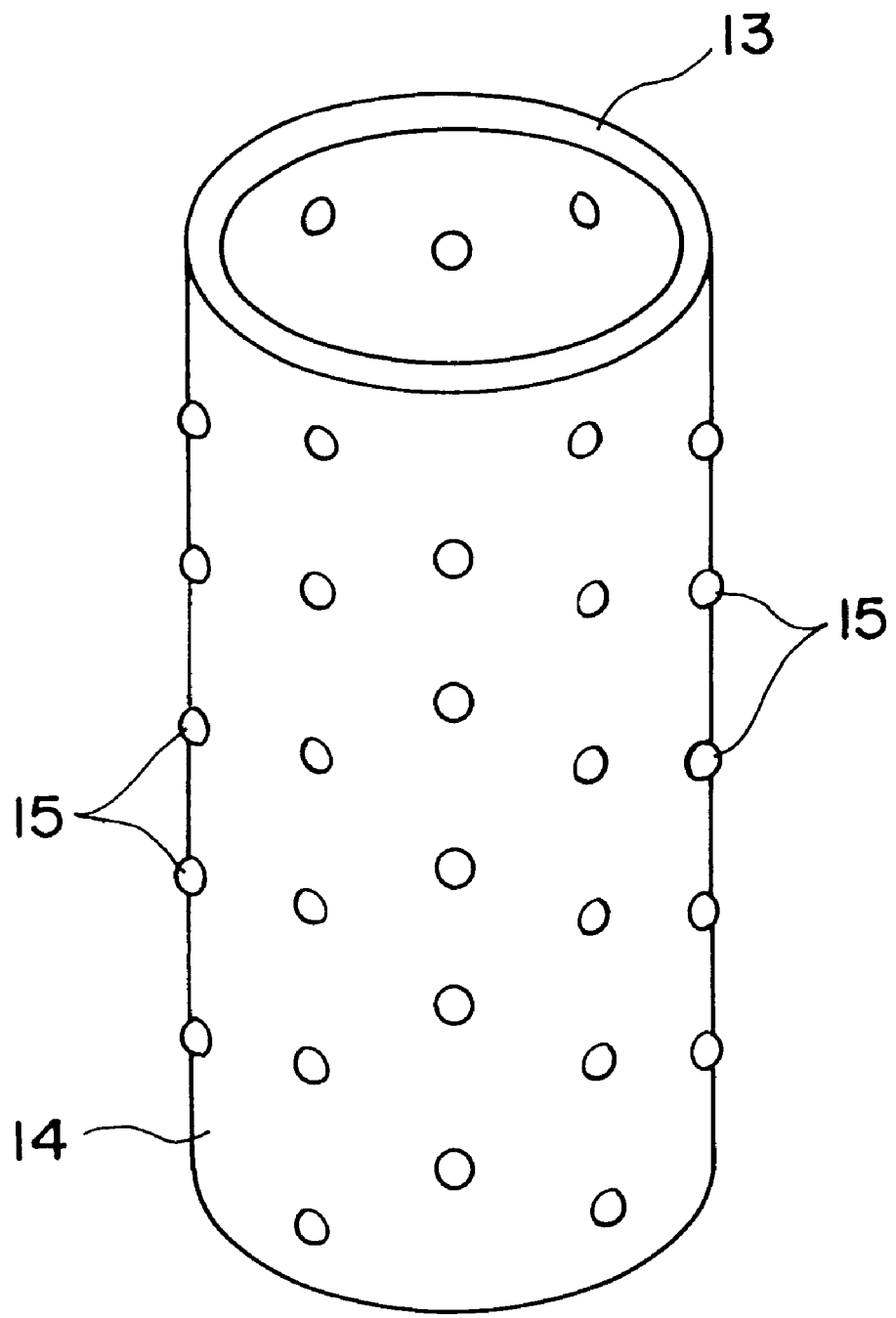
FIG. 4 is a perspective view showing a stroke bearing of the aforementioned, embodiment.

The spindle 11 has a hemispheric probe 12 for abutting to an object on one end thereof (lower side of FIG. 1), and is movably supported by a supporting structure with a plurality of (here, two) stroke bearings 13 linearly connected along the axial direction of the spindle 11. Accordingly, the bearing spun is twice as long as a supporting structure with a single stroke bearing 13. Each stroke bearing 13 has a holding cylinder 14 with a predetermined length and a plurality of balls 15 rotatably accommodated in a plurality of accommodating holes formed around a peripheral wall of the holding cylinder 14, as shown in FIG. 3 and FIG. 4.

A scale holder 22 is attached to the other end (opposite end to the probe 12) of the spindle 11 through two setscrews 21.

A plate-shaped scale 35 having a sensor on a movable side is attached to the scale holder 22 along substantially the whole length parallel to the axis of the spindle 11.

Furthermore, a detent pin 23 is projectingly disposed on one end side (on the side of the supporting structure of the spindle) of the scale holder 22, and a spring stop pin 24 is projectingly disposed on the other end side (on the opposite side of the supporting structure of the spindle), respectively.

The detent pin 23 is slidably inserted into a guiding groove 3 formed along an inner side wall of the case 1 along an axial direction of the spindle 11. In this way, the spindle 11 is allowed to move along the axial direction thereof with the rotations being restricted.

An end of a spring 5 of which the opposite end is stopped to a spring stop pin 4 is stopped to the spring stop pin 24. In this way, the spindle 11 is always biased toward the lower direction in FIG. 1 (i.e. a projecting direction of the spindle 11 from the case 1).

The detecting means 31 has a base 33 fixed along the axial direction of the spindle 11 in the case 1 and having a sensor on stationary side 32, and a scale 35 having a sensor on movable side opposingly disposed against the sensor on stationary side 32 at a predetermined gap G. In the present embodiment, a light casting and receiving IC (integrated circuit) is used as the sensor on stationary side 32, and an optical matrix is used as the sensor on movable side 34, thereby forming an optical detecting means for photoelectrically detecting relative displacement amount of the sensors 32 and 34.

[Structure for Maintaining Gap]

If the gap G fluctuates between the sensor on stationary side 32 and the sensor on movable side 34 in the detecting means 31, miscounting occurs in signal processor, and it is not possible to conduct stable and highly accurate measurement.

Figure 5:
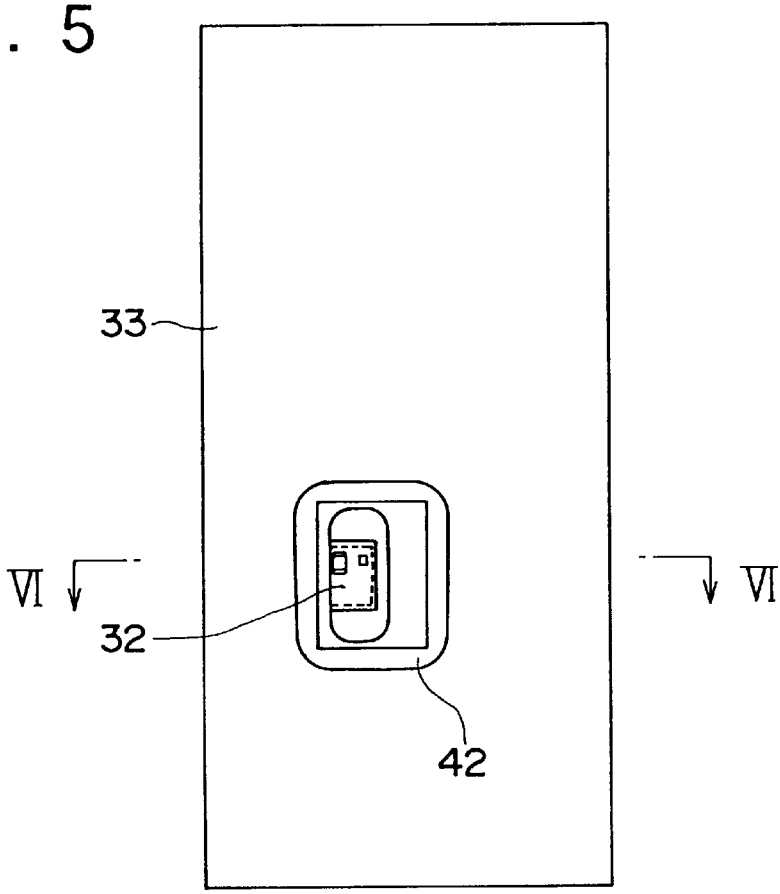
FIG. 5 is a view showing a detecting means (a sensor on stationary side) of the aforementioned embodiment.

In the present embodiment, in order to retain the gap G between the sensor on stationary side 32 and the sensor on movable side 34 within a predetermined allowance, a gap enlargement limiting pin 41 as a gap enlargement limiting member is provided on the other side of the scale holder 22 (opposite side of the supporting structure of the spindle 11). Further, a gap reduction limiting film 42 as a gap reduction limiting member (see FIG. 5) is provided along the periphery of an face of the sensor on stationary side 32 opposing to the sensor on movable side 34.

The gap enlargement limiting pin 41 restricts the gap G being enlarged by abutting to rear wall 1A of the case 1 when the sensor on movable side 34 is displaced away from the sensor on stationary side 32, in other words, the spindle 11 is displaced to the lower direction in FIG. 2. Usually, the space between the gap enlargement limiting pin 41 and the rear wall 1A of the case 1 in a fluctuating direction of the gap G is set as a predetermined value, specifically, 0.1 mm. For instance, a gap enlargement limiting pin 41 is attached to the scale holder 22 with a thickness tape of 0.1 mm inserted therebetween, and the thickness tape is removed thereafter. In this way, the space between the gap enlargement limiting pin 41 and the rear wall 1A of the case 1 is set as 0.1 mm.

Figure 6:
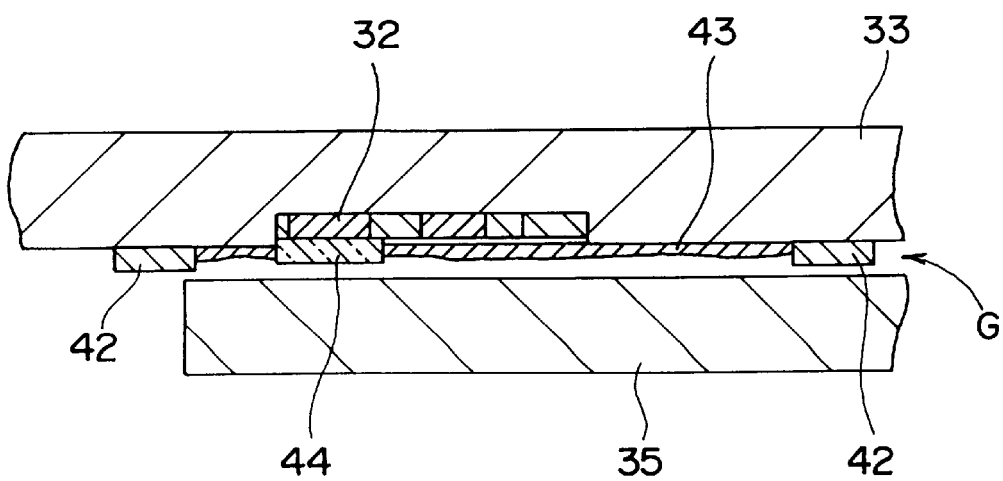
FIG. 6 is a sectional view taken along the vi—vi line in FIG. 5.

The gap reduction limiting film 42 restricts the gap G being lessened by abutting to a surface of the scale 35 when the sensor on movable side 34 is displaced toward the sensor on stationary side, in other words, the spindle 11 is displaced upwardly in FIG. 2. As shown in FIG. 6, the gap reduction limiting film 42 also serves as a dam for a sealing resin 43 used in assembling the sensor on stationary side 32 to the base 33 and as protecting means of a cover glass 44 attached on a surface of the sensor on stationary side 32 from being directly contacting the scale 35. For above reason, the thickness of the gap reduction limiting film 42 is designed so that the distance between the gap reduction limiting film 42 and the scale 35 becomes shorter than the distance between the cover glass 44 or sealing resin 43 and the scale 35.

[Effect of present embodiment]

According to present embodiment, since the gap enlargement limiting pin 41 is provided to the scale holder 22, when the spindle 11 leans temporally by vibration or impact and the sensor on movable side 34 is inclined to be displaced away from the sensor on stationary side 32, the gap enlargement limiting pin 41 is temporally abutted to the rear wall 1A of the case 1 restricting the gap G being enlarged, thereby retaining the gap G within a predetermined allowance. Accordingly, the gap G between the sensor on the movable side 34 and the sensor on stationary side can be retained within a predetermined allowance, resulting in highly accurate measurement.

Furthermore, since the gap enlargement limiting pin 41 is disposed most remote away from the supporting structure of the spindle 11 (stroke bearing 13) thereby restricting the fluctuation at a position where amplitude is most prominent in the case 1 when a slight vibration is caused to the spindle 11 with the supporting structure as a center. Accordingly, the fluctuation of the gap G between the sensor on movable side 34 and the sensor on stationary side 32 can be securely restricted within a predetermined allowance.

Since the gap reduction limiting film 42 is disposed along the periphery of the sensor on stationary side 32, even when the spindle 11 is temporally leaned by vibration or impact and the sensor on movable side 34 is inclined to displace toward the sensor on stationary side 32, the sensor on movable side 34 is abutted to the gap reduction limiting film 42 to restrict the reduction of the gap G, thereby retaining gap G within a predetermined allowance. Accordingly, the gap G is retained within a predetermined allowance, thus resulting in highly accurate measurement.

Furthermore, since the gap reduction limiting film 42 may also serve as a dam for sealing resin 43 used in assembling the sensor on stationary side 32 to the base 33, it is not necessary to provide another member serving as a dam for the sealing resin 43. And it is also possible to prevent the cover glass 44 attached to the surface of the sensor on stationary side 32 from being directly contacted to the scale 35.

Since the spindle 11 is supported by the supporting structure with a plurality of the stroke bearings 13 linearly connected with each other, in other words, the bearing spun can be almost twice as large as conventional supporting structure, the rigidity of the supporting structure can be enhanced. Accordingly, anti-vibration property and anti-impact property can be improved, thereby achieving highly accurate measurement.

[Modification or the like]

Figure 7:
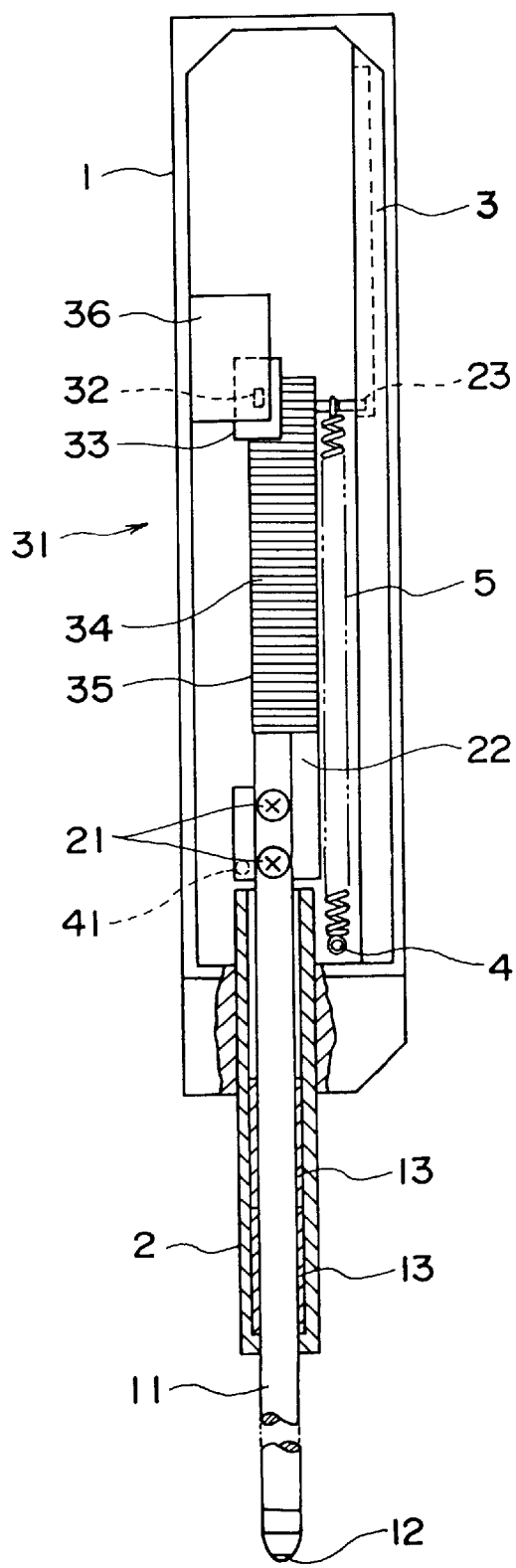
FIG. 7 is a view showing another embodiment of present invention.

In aforementioned embodiment, the detent pin 23 is projectingly disposed on one end of the scale holder 22 (on spindle supporting structure side) and the spring stop pin 24 is projectingly disposed on the other end (on the opposite side of the spindle supporting structure). However, the detent pin 23 and the spring stop pin may be structured as shown in FIG. 7 and 8.

In this structure, the detent pin 23 is projectingly disposed on the other end of the scale holder (on the opposite side of the spindle supporting structure) and the detent pin 23 doubles as spring stop pin 24, and a guiding groove 3 for guiding the detent pin 23 is provided on an upper part of the side wall of the case 1. Accordingly, the sliding movement of the spindle 11 is guided by the detent pin 23 and the guiding groove 3 at the most remote end from the spindle 11 supporting structure, thereby curving the fluctuation of the gap G.

Figure 8:
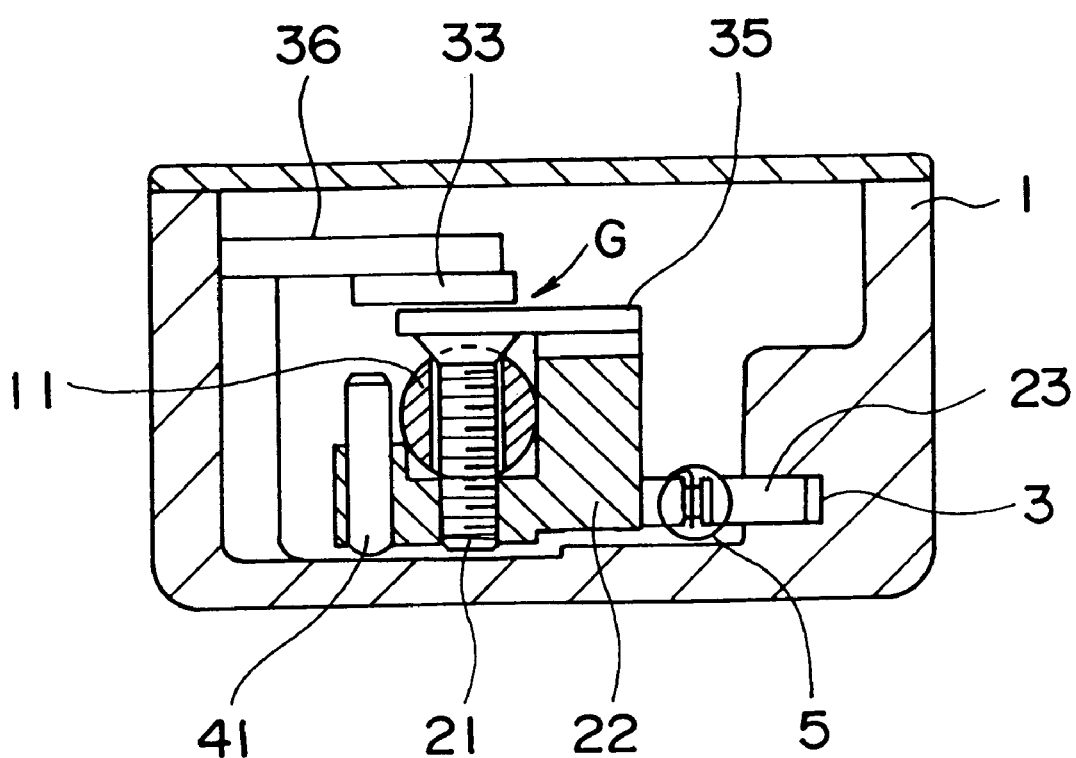
FIG. 8 is a horizontal sectional view of FIG. 7.

In the above structure, the gap enlargement limiting pin 41 may be disposed on the one end (on the spindle 11 supporting structure side) as shown in FIG. 8.

The detent pin 23 may be used as an enlargement limiting means. In this case, it is preferable that the position of the detent pin 23 is located near to the axial line of the spindle 11 thereby effectively limiting the enlargement of the gap by the displacement of the spindle 11. Disposing the detent pin 23 at a position most remote from the spindle 11 supporting structure is useful in using the detent pin 23 simultaneously as an enlargement limiting means.

In aforementioned embodiment, as a gap enlargement limiting member, the gap enlargement limiting pin 41 formed as an independent body to the spindle 11 and the case 11 is projectingly disposed on the scale holder 22 on the spindle 11. However, it is possible to integrally dispose a projection on the scale holder 22.

The disposition of the gap enlargement limiting member is not restricted to the scale holder 22, and may be disposed to the case 1.

In aforementioned embodiment, the gap reduction limiting film 42 is used for a gap reduction limiting member. However, the film is not necessary to be used for a dam of the sealing resin 43, and is not necessary to be continuously formed along the whole periphery if the film is not used for a dam.

The reduction limiting member is not restricted to a gap reduction limiting film 42, and projections or pins may also be applicable. In using projections or pins, it is not necessary that projections and pins are disposed along the periphery of the sensor on stationary side 32, and projections and pins are not necessarily formed continuously, but may be disposed at every predetermined interval.

Further, the disposition of the gap reduction limiting member is not restricted to the sensor on stationary side 32 (abutting to the sensor on movable side 34), and may be disposed on the side of the sensor on movable side 34 on the scale 35. In this disposition, the gap reduction limiting member may be abutted to inner circumference of the case 1 without abutting to the sensor on stationary side 32.

The gap enlargement limiting member and the gap reduction limiting member are disposed to a measuring device simultaneously. However, it is possible to dispose only one of the gap enlargement limiting member and the gap reduction limiting member.

In the aforementioned embodiment, the supporting structure has two stroke bearings linearly connected with each other. However, three or more stroke bearings may be linearly connected for the supporting structure. And a certain space may be provided between each stroke bearing 13.

In the aforementioned embodiment, an optical detecting means 31 is employed. However, transmitting type, not reflective type, optical detecting means may also be applicable. Further, electrostatic type or magnetic type detecting means is also applicable.

In the aforementioned embodiment, the description is made with reference to application to a dial gauge. However, it is also possible to apply to a general measuring device which uses the sensor on stationary side 32 and the sensor on movable side 34 thereby detecting displacement amount of the spindle 11.

What is claimed is:

1. A measuring device having a measuring device body, a spindle disposed movably in an axial direction relative to the measuring device body with a part thereof in the axial direction being supported by the measuring device body and a detecting means for detecting a displacement amount of the spindle relative to the measuring device body, the detecting means including a sensor on a stationary side attached to the measuring device body and a sensor on a movable side provided on the spindle which are oppositely disposed at a predetermined gap therebetween to detect a relative displacement amount of both of the sensors, wherein, any one of the measuring device body and the spindle is provided with a gap enlargement limiting member which limits enlargement of the gap by abutting to the other one of the measuring device body and the spindle when the sensor on movable side is displaced away from the sensor on stationary side.

2. The measuring device according to claim 1, wherein the gap enlargement limiting member is a gap enlargement limiting pin provided on the spindle at a predetermined gap against the measuring device body.

3. A measuring device having a measuring device body, a spindle disposed movably in an axial direction relative to the measuring device body with a part thereof in the axial direction being supported by the measuring device body and a detecting means for detecting a displacement amount of the spindle relative to the measuring device body, the detecting means including a sensor on a stationary side attached to the measuring device body and a sensor on a movable side provided on the spindle which are oppositely disposed at a predetermined gap therebetween to detect a relative displacement amount of both of the sensors, wherein, any one of the measuring device body and the spindle is provided with a gap reduction limiting member which limits reduction of the gap by abutting to the other one of the measuring device body and the spindle when the sensor on movable side is displaced toward the sensor on stationary side.

4. The measuring device according to claim 3, further comprising a gap enlargement limiting member which limits enlargement of the gap by abutting to the other one of the measuring device body and the spindle when the sensor on movable side is displaced away from the sensor on stationary side.

5. The measuring device according to claim 4, wherein the gap enlargement limiting member is a gap enlargement limiting pin provided on the spindle at a predetermined gap against the measuring device body.

6. The measuring device according to claim 3, wherein the gap reduction limiting member is a gap reduction limiting film disposed along a periphery of a face of the sensor on stationary side opposing the sensor on movable side.

7. A measuring device having a measuring device body, a stroke bearing rotatably holding a plurality of balls within a holding cylinder thereof, a spindle disposed movably in an axial direction relative to the measuring device body with a part thereof in the axial direction being supported by the measuring device body and a detecting means for detecting a displacement amount of the spindle relative to the measuring device body, the detecting means including a sensor on a stationary side attached to the measuring device body and a sensor on a movable side provided on the spindle which are oppositely disposed at a predetermined gap therebetween to detect a relative displacement amount of both of the sensors, wherein, the spindle is movably supported by the measuring device body through a supporting structure with a plurality of the stroke bearings linearly connected with each other, and a gap enlargement limiting member provided on any one of the measuring device body and the spindle which limits enlargement of the gap by abutting to the other one of the measuring device body and the spindle when the sensor on movable side is displaced away from the sensor on stationary side.

8. The measuring device according to claim 7, wherein the gap enlargement limiting member is a gap enlargement limiting pin provided on the spindle at a predetermined gap against the measuring device body.

9. The measuring device according to claim 8, wherein the gap enlargement limiting pin is disposed more remote away from the sensor on movable side relatively than a tip end of the spindle abutting to an object to be measured.

10. The measuring device according to claim 7, further comprising a gap reduction limiting member which limits reduction of the gap by abutting to the other one of the measuring device body and the spindle when the sensor on movable side is displaced toward the sensor on stationary side.

11. The measuring device according to claim 10, wherein the gap reduction limiting member is a gap reduction limiting film disposed along a periphery of a face of the sensor on stationary side opposing the sensor on movable side.

12. The measuring device according to claim 11, wherein the gap reduction limiting film is disposed continuously along the whole periphery of the face of the sensor on stationary side opposing the sensor on movable side; and wherein the gap reduction limiting film is also applicable as a dam for sealing resin of the sensor on stationary side.

13. A measuring device having a measuring device body, a stroke bearing rotatable holding a plurality of balls within a holding cylinder thereof, a spindle disposed movably in an axial direction relative to the measuring device body with a part thereof in the axial direction being supported by the measuring device body and a detecting means for detecting a displacement amount of the spindle relative to the measuring device body, the detecting means including a sensor on a stationary side attached to the measuring device body and a sensor on a movable side provided on the spindle which are oppositely disposed at a predetermined gap therebetween to detect a relative displacement amount of both of the sensors, wherein, the spindle is movably supported by the measuring device body through a supporting structure with a plurality of the stroke bearings linearly connected with each other, and a gap reduction limiting member which limits reduction of the gap by abutting to the other one of the measuring device body and the spindle when the sensor on movable side is displaced away from the sensor on stationary side.

* * * * *